US008544506B2

(12) United States Patent
Auriol

(10) Patent No.: US 8,544,506 B2
(45) Date of Patent: Oct. 1, 2013

(54) METHOD FOR MAKING A RIVET AND RIVET OBTAINED BY SAID METHOD

(75) Inventor: Jean-Marc Auriol, Flourens (FR)

(73) Assignee: ERIS, Flourens (FR)

( * ) Notice: Subject to any disclaimer, the term of this patent is extended or adjusted under 35 U.S.C. 154(b) by 382 days.

(21) Appl. No.: 12/594,660

(22) PCT Filed: Mar. 25, 2008

(86) PCT No.: PCT/FR2008/050511
§ 371 (c)(1),
(2), (4) Date: Nov. 17, 2009

(87) PCT Pub. No.: WO2008/142311
PCT Pub. Date: Nov. 27, 2008

(65) Prior Publication Data
US 2010/0119330 A1    May 13, 2010

(30) Foreign Application Priority Data
Apr. 12, 2007  (FR) ...................................... 07 54407

(51) Int. Cl.
*B21F 29/00*    (2006.01)
(52) U.S. Cl.
USPC .................................. 140/29; 140/28; 140/27
(58) Field of Classification Search
USPC ..................................................... 470/27–33
See application file for complete search history.

(56) References Cited

U.S. PATENT DOCUMENTS

| 2,261,318 | A |   | 11/1941 | Wilcox |
| 2,426,422 | A | * | 8/1947  | Torresen .......................... 470/29 |
| 2,429,239 | A | * | 10/1947 | Rogers ............................. 411/20 |
| 2,436,185 | A | * | 2/1948  | Torresen .......................... 411/19 |
| 2,586,336 | A |   | 2/1952  | Huck |
| 4,136,417 | A | * | 1/1979  | Dahmen et al. .................. 470/31 |
| 4,221,041 | A | * | 9/1980  | Hufnagl et al. .................. 29/512 |
| 5,359,765 | A | * | 11/1994 | Auriol et al. ................ 29/525.07 |
| 5,651,172 | A | * | 7/1997  | Auriol et al. .................... 29/512 |
| 5,855,054 | A | * | 1/1999  | Rivera et al. ............... 29/525.06 |
| 6,267,684 | B1| * | 7/2001  | Luhm .............................. 470/16 |
| 7,124,492 | B2| * | 10/2006 | Wojciechowski et al. ...... 29/515 |
| 7,284,319 | B2| * | 10/2007 | Kato et al. ....................... 29/798 |

FOREIGN PATENT DOCUMENTS

FR    2 587 421 A    3/1987

OTHER PUBLICATIONS

English Translation of the Written Opinion of the International Search Authority, Nov. 3, 2009, from International Phase of the instant application.
English Translation of International Preliminary Report on Patentability Chapter I, Nov. 3, 2009, from International Phase of the instant application.

(Continued)

*Primary Examiner* — Dana Ross
*Assistant Examiner* — Lawerence Averick
(74) *Attorney, Agent, or Firm* — Jackson Patent Law Office

(57) ABSTRACT

The invention relates to a method for making a rivet (R), of the type comprising, by deformation of the material of a substantially cylindrical metal segment, the operations of preforming a milled head (100) at the end of a rod (200), characterised in that it comprises, by deformation of the material (cold stamping) the following operations: creating a portion with a lower diameter (210) from the free end; creating a substantially cylindrical hollow core (220) for forming a tubular portion; preforming the hollow core (220) as a truncated cone; performing the lower diameter outer surface as a truncated cone. The invention also relates to the rivet obtained by said method.

5 Claims, 4 Drawing Sheets

(56) References Cited

OTHER PUBLICATIONS

International Search Report, Oct. 7, 2008, from International Phase of the instant application.

* cited by examiner

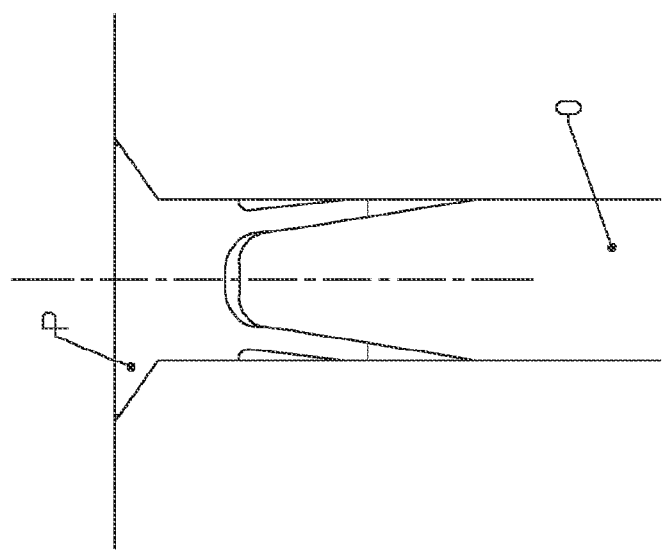
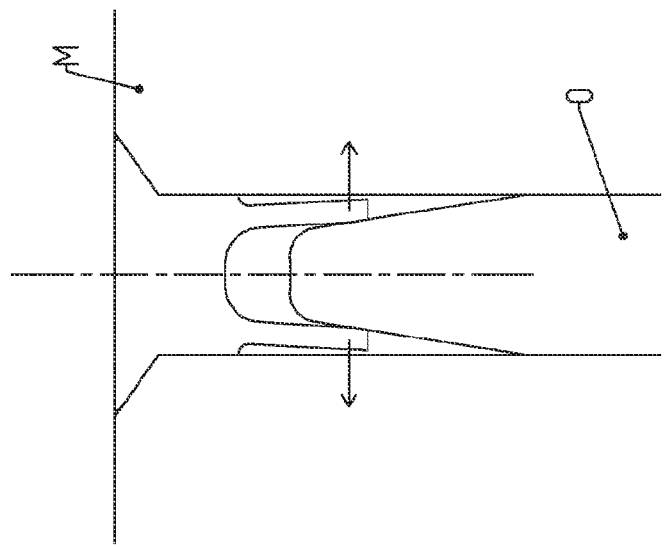
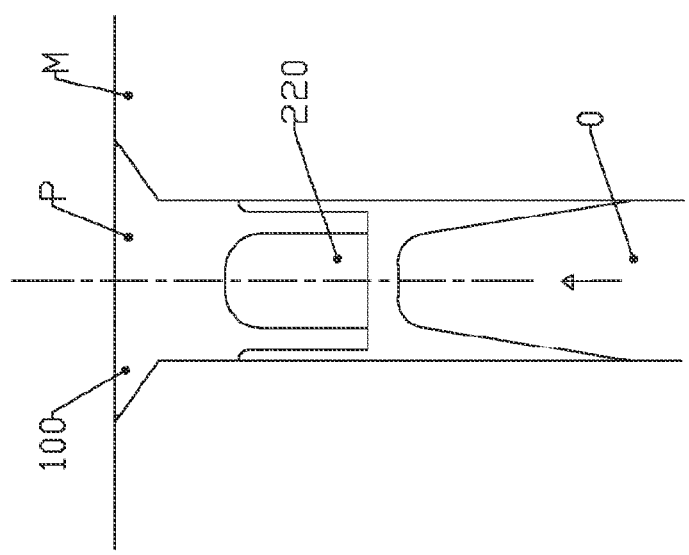

METHOD FOR MAKING A RIVET AND RIVET OBTAINED BY SAID METHOD

FIELD OF THE INVENTION

The invention relates to the manufacturing of rivets and in particular the adaptations making it possible to simplify the methods of manufacturing while optimising the technical characteristics of the latter.

DESCRIPTION OF PRIOR ART

Semi-tubular rivets exist in prior art of the type of those that include a preformed head and a rod provided with an axial drilling in order to form a tubular portion opposite the preformed head.

These rivets have the advantage of being particularly adapted for the carrying out of the assembly of parts made of soft or fragile materials in particular synthetic materials such as composite material.

One of these rivets described in patent FR 2587421 has for specificity to be arranged with a peripheral groove on the external surface of the rod on the tubular portion of the latter. A docking surface is preserved on said external surface at the end of the rod. This peripheral groove thus prevents the contact of this portion of the rivet with the edges of the hole arranged in the parts to be joined, contact which is likely to damage said part.

This rivet nevertheless has the disadvantage of requiring a machining of its external surface in order to arrange said peripheral groove and in order to create said docking surface.

This machining operation increases the cost of manufacturing the rivet while modifying its technical characteristics. Indeed, although the rivet is preformed by a cold heading technique the carrying out of such a groove is implemented by machining which has for effect to break the fibres of the metal which can contribute to a poor fatigue strength of the rivet.

DESCRIPTION OF THE INVENTION

In light of this fact, the applicants have carried out research aiming to reduce the cost of manufacturing these rivets while optimising the technical qualities.

This research has resulted in the designing of a method for manufacturing rivet that is particularly advantageous, resolving the problems of prior art.

This method for manufacturing a rivet is of the type of that comprising by deformation of the material of a substantial cylindrical metal section, the preformation operations of a countersunk head at the end of a rod and is remarkable in that it comprises the carrying out by deformation of the material (cold heading) the following operations:

creation of a portion with less diameter starting at the free end,
creation of a substantially cylindrical hollow core in order to form a tubular portion,
preformation as a truncated cone of the hollow core,
preformation as a truncated cone of the external surface of less diameter.

By proposing an embodiment that does not require a machining operation for this portion of the rivet, the applicants have designed a method reducing the costs of manufacturing the rivet. Furthermore, such a method remains in the continuity of the cold heading operations participating in the manufacturing of the rivet and preceding the operations of carrying out the groove and the tube.

This characteristic is particularly advantageous in that it guarantees the fibre formation of the material and improves the metallurgical state of the rivet. This method further allows the size of the grains to be refined.

A non-negligible technical effect of this method resides in the pre-orientation of the fibres of the metal which favours the deformation of the rivet during its installation.

The fastening or the rivet are considered in a plurality of materials such as titanium, T40, titanium with columbium, steel, stainless steel, etc.

The method is furthermore remarkable in that it comprises softening the material used by heat treatment. The hard metals used thus undergo a softening operation.

According to another particularly advantageous characteristic, the method comprises preforming from a cylindrical surface the large base of the truncated cone formed exteriorly. As such, docking surfaces are also likely to be created via plastic deformation.

The use of such a method of realisation required a modification of the geometry of this rivet.

According to a particularly advantageous characteristic, this rivet is remarkable in that it is comprised of at least three parts:

a tapered head linked by its small base to the rod,
a first cylindrical portion of a rod with diameter corresponding to the small base of the head,
a tapered portion of the rod of which the small base with diameter less than the diameter, is linked to the first cylindrical portion and of which the large base adopts the same diameter as the first cylindrical portion.

According to another characteristic, the rivet comprises a fourth part, i.e. a second cylindrical portion with rod of likewise diameter as the first cylindrical portion.

Of course, the invention also relates to the method comprising the operations required in order to carry out a rivet such as described hereinabove.

As the basic concepts of the invention have just been exposed hereinabove in their most basic form, other details and characteristics will become clearer when reading the following description and with regards to the annexed drawings, provided by way of a non-limiting example, an embodiment of a method for manufacturing rivet and a rivet in accordance with the invention.

BRIEF DESCRIPTION OF THE DRAWINGS

FIGS. 2a, 2b, 2c show the steps of the deformation of the metal section in FIG. 1 for the purposes of carrying out an embodiment of a rivet in accordance with the invention.

DESCRIPTION OF PREFERRED EMBODIMENTS

Figure 1:
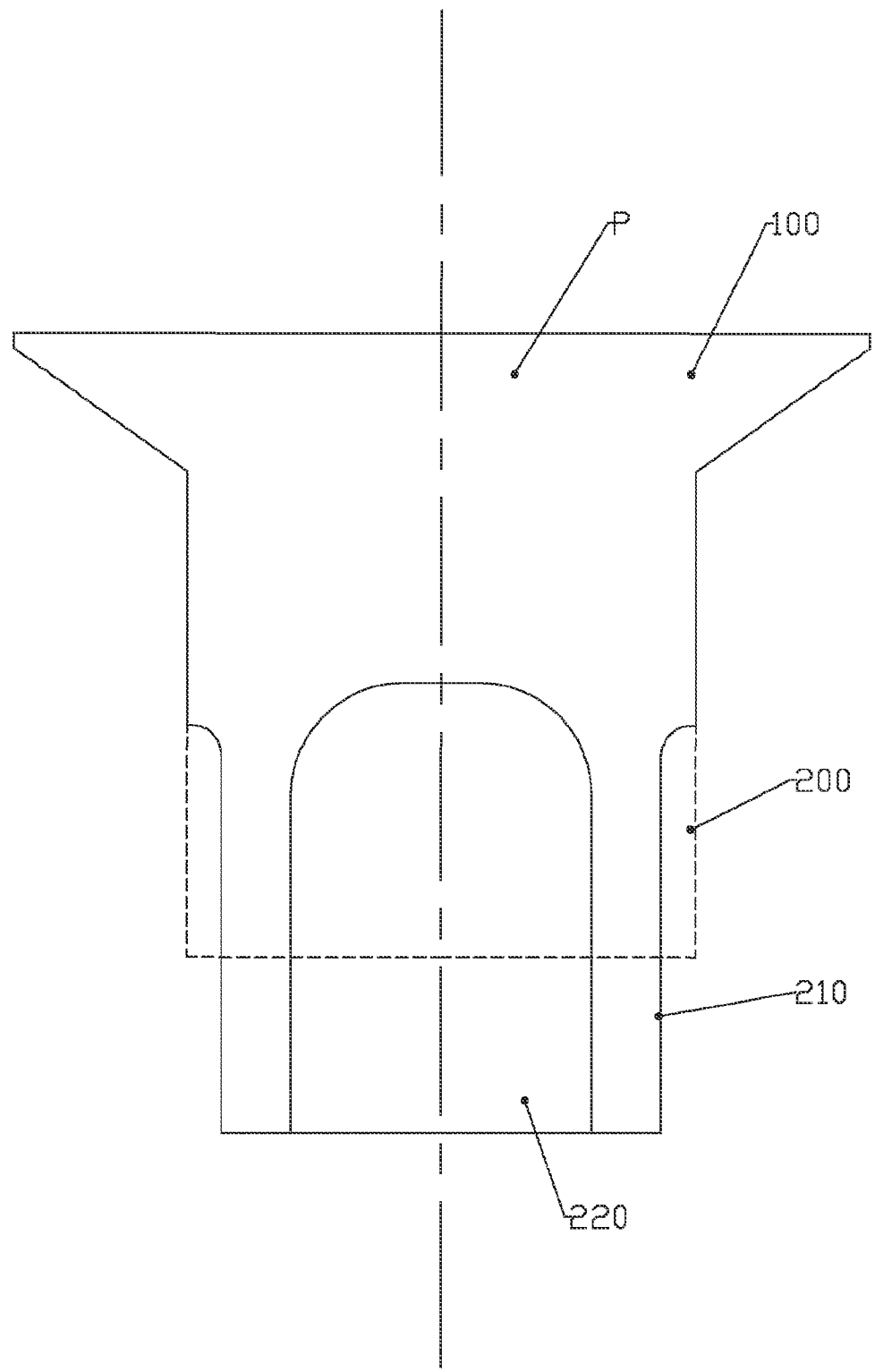
FIG. 1 is a cross-section view of an embodiment of a metal section corresponding to a rivet in the process of being carried out.

Such as shown in the drawing in FIG. 1, the method of the invention is of the type of that comprising beforehand the carrying out by plastic deformation of the material i.e. by forging starting with a substantial cylindrical metal section, the preformation of a countersunk head 100 at the end of a rod 200 appearing as short dashes.

The method of the invention is remarkable in that it always comprises by deformation of the material (cold heading) the creation of a portion 210 of rod with less diameter starting from the free end.

Furthermore, the method ensures the creation of a substantially cylindrical hollow core 220 in order to form a tubular portion. The part P obtained is that shown as thick lines in the drawing in FIG. 1.

This part P is placed in a matrix M which, associated with a "punch", ensures the following operations:
preformation as a truncated cone of the hollow core,
preformation as a truncated cone of the external surface of lesser diameter.

This matrix M comprises a cylindrical housing of which one end is countersunk so that the head of the part P can be housed therein. Once in place the part P is maintained in position and a punch O with a tapered end penetrates into the hollow core 220 as shown in FIG. 2b. In this movement, the edges of the tube forming this end of the part P separate in order to return to the tapered form of the punch until the external surface of said tube comes into contact with the surface of the housing of the matrix M as shown in FIG. 2c. The external surface also takes the form of a truncated cone. The movement is continued until a cylindrical docking surface at the end of the external surface of the rod is created.

Figure 3:
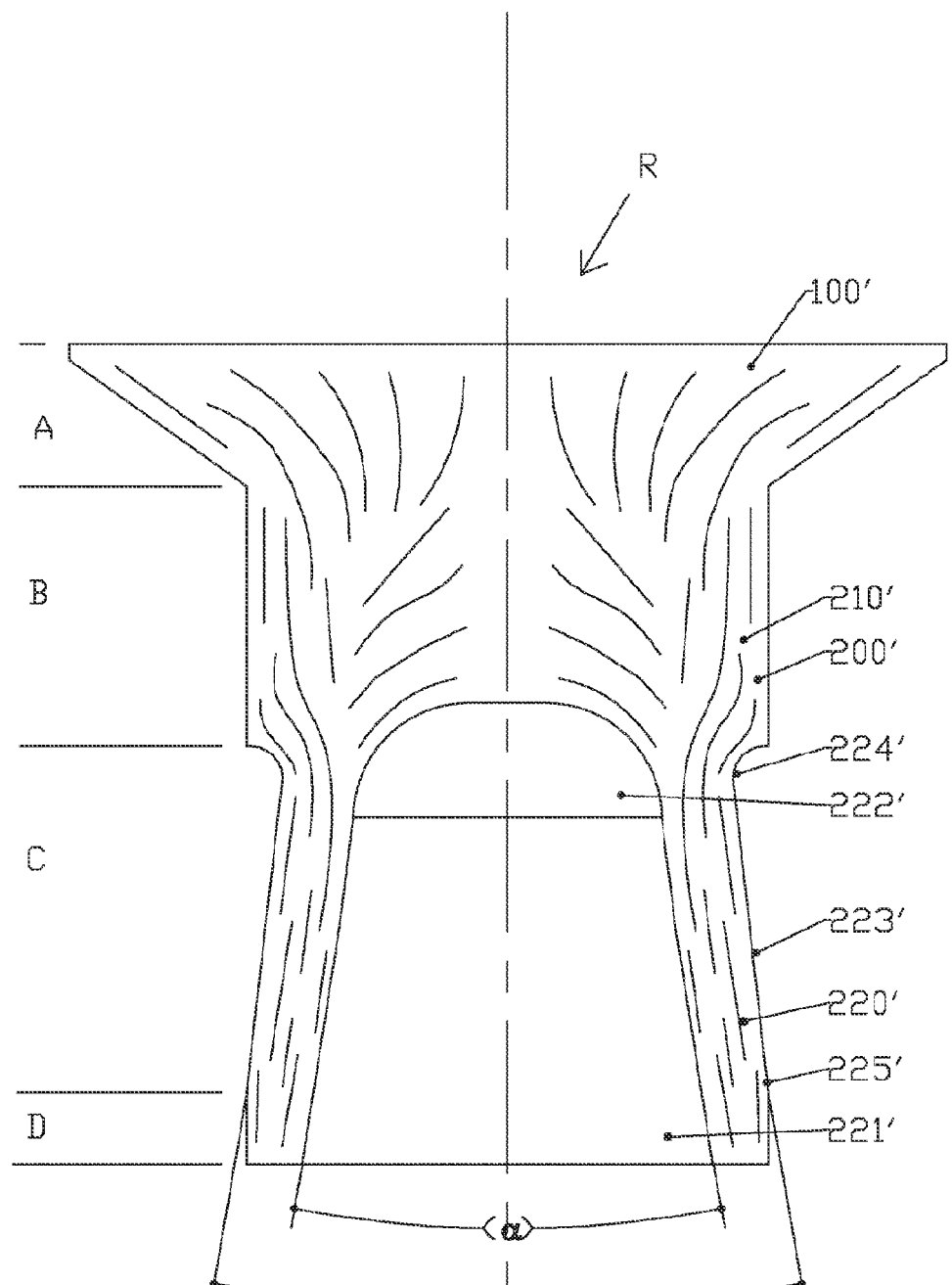
FIG. 3 is a cross-section view of an embodiment of a rivet in accordance with the invention.

The rivet R obtained as such is shown in the drawing in FIG. 3. It includes a countersunk head 100' and a rod 200' composed of a solid portion 210' located under the preformed head 100' and a semi-tubular portion 220' located opposite the head.

As shown the semi-tubular portion 220' is provided with an axial hole 221' of tapered form expanding towards the opposite the preformed head and exiting at this end. The angle α taper is between 10 and 30 degrees. According to a preferred embodiment, the angle α is equal to 20 degrees.

As shown, the bottom 222' of the hole adopts the form of a spherical dome and the hole 221' extends over a little more than half of the length of the rod 200'.

On the tubular portion 220', the external surface of the rod adopts a tapered form 223' of which the angle β is between 10 and 30 degrees. According to a preferred embodiment, the angle is equal to 20 degrees. As such, according to a preferred embodiment, the rod 200' is preformed interiorly and exteriorly on its tubular portion according to the same cone angle. The top 224' of the truncated cone 223' originates under the solid portion of the rod 210' and adopts a diameter less than said rod. The base 225' of the cone returns to the diameter of said solid portion 210' of rod.

The correspondence between the top 224' of the external cone with that 222' of the internal cone 221' makes it possible to create a zone of material of less thickness predisposed to the deformation required for the installation. It further allows for the formation of a withdrawn volume preventing the deformation of the tubular portion of the rivet from resulting in a bearing on the surfaces that is not provided for this purpose of the part to be fastened. The presence of this withdrawn volume further allows thicknesses of variable material to be assembled.

In fact, the embodiment shown for rivet has exteriorly four main parts:
a tapered head A linked by its small base to the rod,
a first cylindrical portion B of rod with diameter corresponding to the small base of the head,
a tapered portion C of rod of which the small base is linked to the first cylindrical portion and of which the large base adopts the same diameter as the first cylindrical portion,
a second cylindrical portion D of rod with likewise diameter as the first cylindrical portion B.

This second part is not mandatory and an embodiment not shown of the rivet R is in three parts without final cylindrical portion.

This FIG. 3 also shows the orientation of the fibres of the metal. It clearly appears that the use of a method of forging for all of the operations of carrying out the rivet R makes it possible to obtain a rivet of which the fibres are not damaged and are pre-oriented for the deformation required when installing said rivet R.

According to a characteristic not shown, the thickness of the tube is constant from the end linked to the solid portion to the open end of the rod.

Figure 4A:
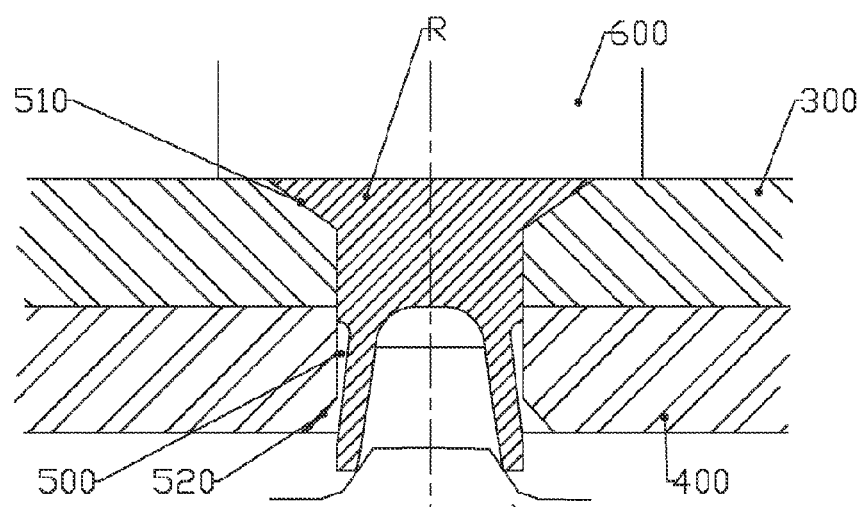
FIGS. 4a, 4b and 4c, show the steps of the installation of the rivet of the invention.
Figure 4B:
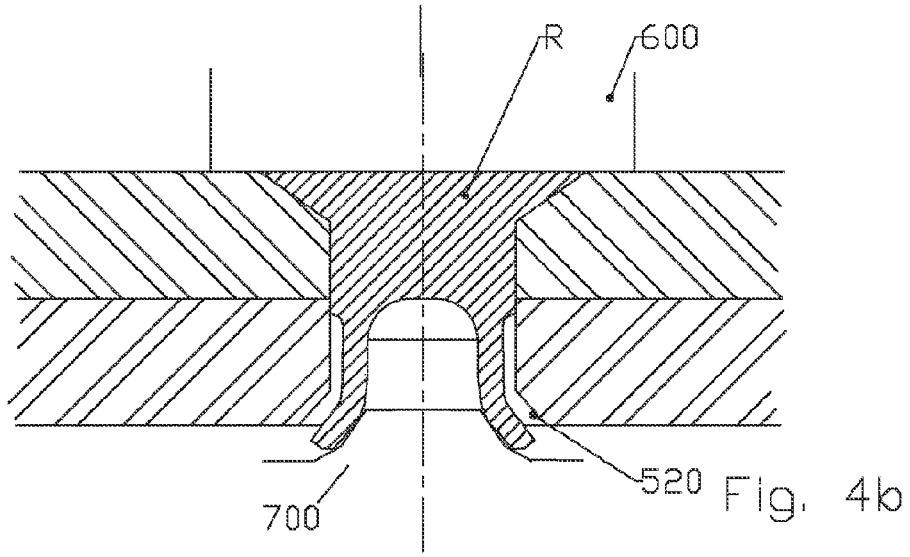
Figure 4C:
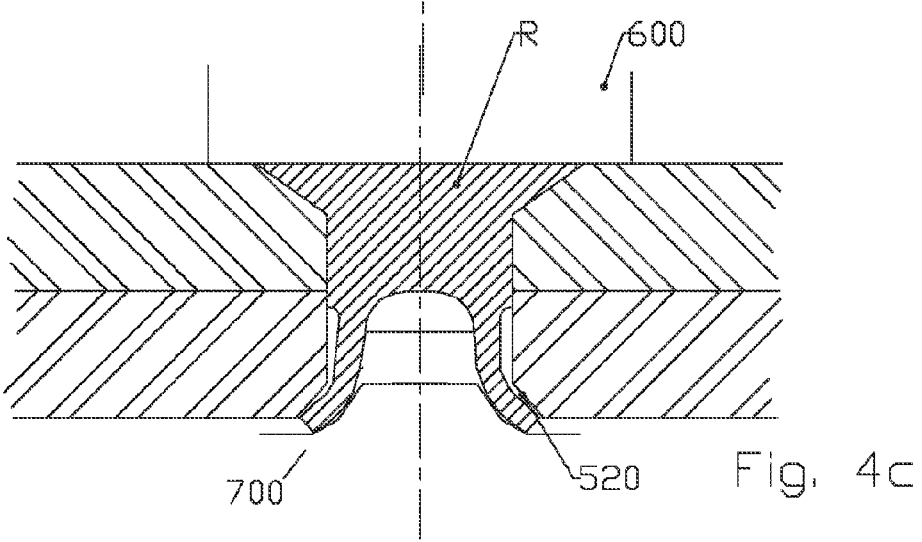

FIGS. 4a, 4b and 4c show the installation of the rivet of the invention.

This installation is carried out for the purposes of fastening two parts 300 and 400 of material composite. These parts 300 and 400 are pierced by a hole 500 of which the bore corresponds to the external diameter of the rod of the rivet with a low spacing, identical tapered countersunk holes 510 and 520 are made on both sides of parts 300 and 400 which correspond to the ends exiting from hole 500.

The riveting is carried out using two riveting dies 600 and 700 such as shown schematically in these FIGS. 4a, 4b and 4c, one 600 playing the role of a counter bearing on the side of the head and the other 700 being subjected to a pressure in order to form the second head and carry out the riveting.

As shown in the drawing in FIG. 4b, the rivet R is deformed first without docking then the surface corresponding to the end of the rivet R or the docking surface comes to be applied against the countersunk hole 520 as shown in the drawing in FIG. 4c. As shown and in accordance with the characteristics sought for such a rivet, the presence of a withdrawn form on the external surface of the rivet causes a folding of its end without contact with the linking edge between the countersunk hole 520 and the hole 500.

It is understood that the method and the rivet, which have just been described and shown hereinabove, have been described and shown in light of a divulgation rather than as a limitation. Of course, various arrangements, modifications and improvements can be made to the example hereinabove, without however leaving the scope of the invention.

The invention claimed is:

1. A method for manufacturing a rivet, the method comprising:
receiving a substantial cylindrical metal member defining a central axis, a first end, and a second end, the metal member including a countersunk head at the first end, and a first cylindrical portion extending from the countersunk head to the second end, the first cylindrical portion defining a first diameter;
subsequently, creating a second cylindrical portion by cold heading, the second cylindrical portion defining a second diameter less than the first diameter along the entire second cylindrical portion, the second cylindrical portion extending from the second end;
creating a substantially cylindrical hollow core in order to form a tubular portion along the central axis, the tubular portion defining an opening at the second end; and
subsequently, transforming the tubular portion to form a portion including a tapered internal surface and a tapered external surface, wherein the steps above are performed while keeping part of the first cylindrical portion defining the first diameter.

2. A method of manufacturing according to claim 1, further comprising softening the material used by heat treatment.

3. A method of manufacturing according to claim 1, further comprising transforming a portion of the tapered external surface into a cylindrical surface.

4. A method for manufacturing a rivet according to claim 1 wherein the step of transforming is performed using a punch.

5. A method for manufacturing a rivet according to claim 1 wherein the step of creating a second cylindrical portion includes creating the second cylindrical portion such that the second diameter is a nonincreasing function of a distance from the first end.

\* \* \* \* \*